United States Patent [19]
Doyle

[11] 3,968,993
[45] July 13, 1976

[54] VEHICLE SEAT ASSEMBLY

[75] Inventor: Timothy K. Doyle, Livonia, Mich.

[73] Assignee: Ford Motor Company, Dearborn, Mich.

[22] Filed: May 22, 1975

[21] Appl. No.: 580,073

[52] U.S. Cl. .............................. 297/355; 297/361; 297/378
[51] Int. Cl.² .................... A47C 1/024; B60N 1/06
[58] Field of Search ........... 297/313, 321, 328, 354, 297/355, 361, 362, 378, 379; 248/371, 396–398

[56] References Cited
UNITED STATES PATENTS

| | | | |
|---|---|---|---|
| 459,312 | 9/1891 | Sauer | 297/313 X |
| 1,702,284 | 2/1929 | Thien et al. | 297/355 |
| 1,770,826 | 7/1930 | Allgeyer | 297/361 |
| 2,576,343 | 11/1951 | Hibbard et al. | 297/361 X |
| 3,001,821 | 9/1961 | Marechal | 297/379 X |
| 3,062,584 | 11/1962 | Galla | 297/374 |
| 3,550,949 | 12/1970 | Bonnaud | 297/379 X |

FOREIGN PATENTS OR APPLICATIONS

| | | | |
|---|---|---|---|
| 1,480,466 | 9/1969 | Germany | 297/361 |
| 962,075 | 6/1964 | United Kingdom | 297/313 |

Primary Examiner—James T. McCall
Assistant Examiner—William E. Lyddane
Attorney, Agent, or Firm—John J. Roethel; Keith L. Zerschling

[57] ABSTRACT

A vehicle seat assembly comprising a substantially horizontal seat structure and a normally upright backrest structure. The backrest structure is carried on support arms pivotally connected to the seat structure for swinging movement about a fixed pivot axis extending laterally of the latter. A four-bar linkage adjuster mechanism is interposed between the seat structure and the backrest structure. The four-bar linkage of the adjuster mechanism terminates in a movable abutment engageable by an abutting portion of the backrest structure. Under control of the linkage the abutment is movable in the path taken by the abutting portion of the backrest when the latter is swung rearwardly from its normal upright position to a predetermined rearwardly inclined position.

A releasable brake means holds the four-bar linkage and thereby the abutment against movement to block rearward inclination of the backrest structure. The backrest is forwardly swingable, however, from any position relative to the seat structure independently of engagement with the adjuster mechanism.

2 Claims, 3 Drawing Figures

VEHICLE SEAT ASSEMBLY

BACKGROUND OF THE INVENTION

In conventional two-door vehicles, the backrest structure of the vehicle front seat is pivotally mounted for forward tilting movement over the horizontal portion of the seat structure. This is necessary to provide for easier ingress and egress to the rear seat of the vehicle. In compact size vehicles, it has been found necessary to support the backrest structure on curved support arms which are pivotally-connected to the seat structure some distance forwardly of the seat rear edge. Thus, when the backrest is tilted forwardly, it also is bodily shifted upwardly to clear the cushion therebeneath and to open up a greater access aisle to the rear seat area. It is frequently desired to incorporate a mechanism permitting the backrest structure to be rearwardly inclined to provide a recliner seat. This requires that an adjuster be incorporated in the vehicle seat structure.

If the pivot axis about which the backrest structure is forwardly tiltable is located substantially beneath the backrest structure, simple bell crank mechanisms may be adapted to control the rearward recliner positions. Such simple bell crank mechanisms are disclosed in U.S. Pat. No. 3,024,607 issued to M. Brandoli on Mar. 6, 1962 for a "Seat Having Adjustable Back", in U.S. Pat. No. 3,046,055 issued to J. E. Martens on July 24, 1962 for "Position-Adjusting Mechanism", and U.S. Pat. No. 3,062,584 issued Nov. 6, 1962 to S. J. Galla for "Vehicular Seat Assembly".

If the pivot axis of the backrest is located substantially forward of the backrest structure, however, adaptation of simple bell crank mechanisms have been found not to be feasible within passenger compartment packaging restrictions. That is, it is not feasible to conceal the mechanism beneath the seat structure to assure ocupant anonymity of the mechanism.

Accordingly, it is an object of the present invention to utilize a four-bar linkage adjuster mechanism in place of the simple bell crank adjuster mechanisms, the path taken by the four-bar adjuster mechanism being capable of closely approximating the path of the backrest. Despite the effect of the offset pivot axis, this allows packaging of the adjuster mechanism within close proximity of the rear of the seat structure.

SUMMARY OF THE INVENTION

The vehicle seat assembly embodying the present invention comprises a substantially horizontal seat structure and a normally upright backrest structure, the backrest structure being carried on support arms pivotally connected to the seat structure for swinging movement about a fixed pivot axis extending laterally of the latter. A four-bar linkage adjuster mechanism is interposed between the seat structure and the backrest structure. The four-bar linkage of the adjuster mechanism terminates in a movable abutment engageable by an abutting portion of the backrest structure. Under control of the linkage the abutment is movable in a path complementary to that taken by the abutting portion of the backrest when the latter is swung rearwardly from its normal upright position to a predetermined rearwardly inclined position.

A releasable brake means holds the four-bar linkage and thereby the abutment against movement to block rearward inclination of the backrest structure. The backrest is forwardly swingable, however, from any position relative to the seat structure independently of engagement with the adjuster mechanism.

DESCRIPTION OF THE DRAWINGS

Further features and advantages of the present invention will be made more apparent as this description proceeds, reference being had to the accompanying drawings, wherein.

DETAILED DESCRIPTION OF THE INVENTION

Figure 1:
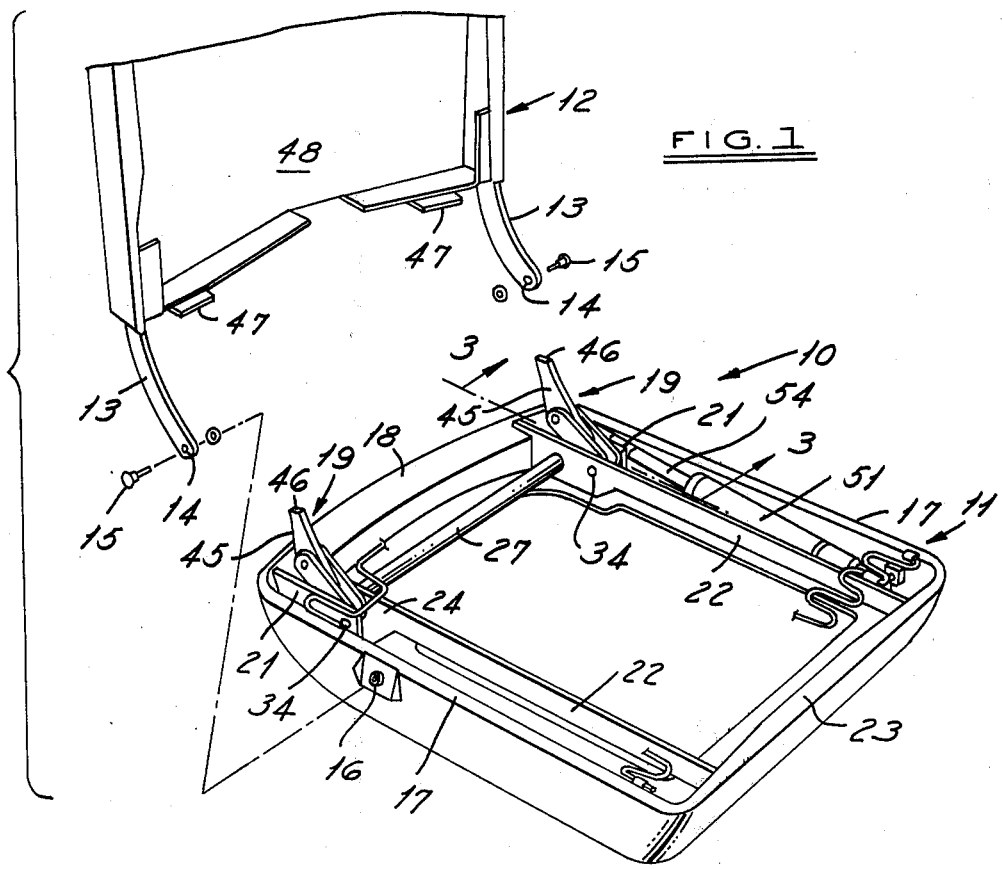
FIG. 1 is a partially exploded perspective view of a vehicle seat assembly embodying the present invention.

Referring now to the drawings and particularly to FIG. 1, there is shown the components of a vehicle seat assembly, generally designated 10, less the cushions, springs and trim material. The seat assembly 10 comprises a substantially horizontal seat structure or frame 11 and a backrest structure or frame 12 which, when installed in a vehicle body, has a normally upright position.

The backrest structure 12 has a pair of depending forwardly curved arms 13 which at their lower ends are apertured at 14 to receive pivot studs 15. The pivot studs 15 are threadedly anchored in aperture 16 in the side rail 17 of the seat structure. The pivot axis defined by the pivot studs 15 thus extends laterally of the seat structure or frame 11 and is located forward of the rear frame member 18 of the seat structure.

The backrest structure or frame 12 is pivotally mounted so that it may be tilted forwardly over the seat structure to provide for easier ingress to or egress from the rear seat area of the vehicle body, the seat assembly 10 being particularly adapted for use in a two-door model vehicle. The curved support arms 13 are necessary to permit the backrest to be bodily raised as it swings over the cushion (not shown) on the seat structure or frame 12. This construction and arrangement effectively enlarges the access aisle to the area behind the seat assembly 10.

The foregoing describes a conventional two-door vehicle seat assembly particularly as used in compact size vehicles.

A desirable merchandising feature and also a government requirement in some foreign countries is the provision that the backrest structure 12 be rearwardly tiltable to provide a recliner seat assembly. The present invention embodies an adjuster mechanism permitting controlled positioning of the backrest from a normal upright position to a reclined position on the order of a 15° angle of rearward inclination.

Figure 2:
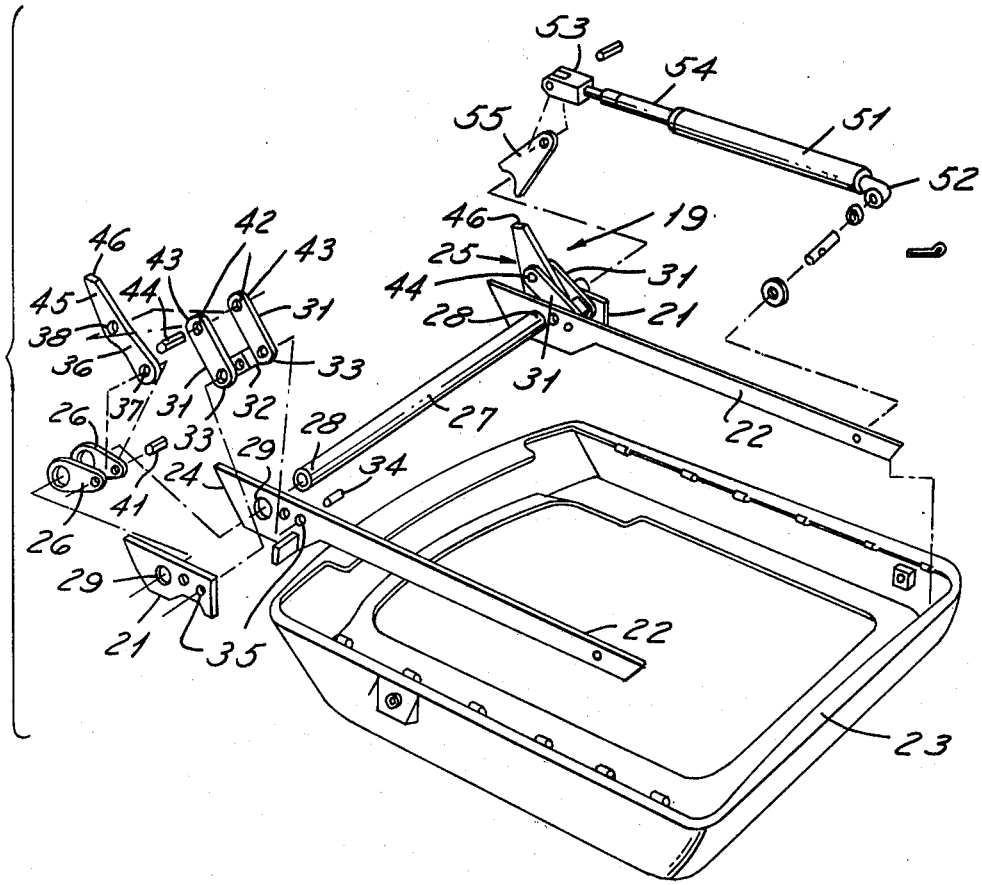
FIG. 2 is an exploded perspective view of the seat structure and the adjuster mechanism components mounted therein.

As disclosed, the rear inclination is preferably controlled by duplicate or twin adjuster mechanisms generally designated 19, there being a unit 19 located adjacent each side rail 17 between the pivot axis defined by the pivot studs 15 and the rear frame member 18 of the seat structure or frame 11. The side rails 17 of the seat structure are structurally reinforced by a short outboard reinforcing plate 21 welded adjacent the inside of the side rail 17 and an elongated reinforcing member 22 which is adapted to be welded to the rear frame member 18 and a front frame member 23 of the seat structure or frame 11 in parallel spaced relationship to form a cage for receiving links and cranks of a four-bar linkage system, generally designated 25, as best viewed in FIGS. 2 and 3.

The elements that comprise the four-bar linkage system 25 of each adjuster mechanism unit 19 are links or cranks 26 which are coupled to a shaft 27 that extends laterally of the sheet structure or frame in parallel relation to the pivot axis defined by the pivot studs 15. The respective ends 28 of the shaft 27 are journalled in aligned apertures 29 in the reinforcing plate 21 and adjacent end 24 of the reinforcing member 22. The links or cranks 26, there being two of each in spaced relationship to each other on the shaft ends 28, are welded or otherwise keyed to the shaft 27.

The four-bar linkage system 25 elements further include followers or cranks which extend in a substantially horizontal direction. Each follower or crank comprises a pair of spaced links 31, the links 31 being spaced by a spacer or washer 32. The links 31 are apertured at one end 33 to receive a shaft 34 extending between aligned apertures 35 in the reinforcing plate 21 and its companion end 24 of the elongated reinforcing member 22. The links 31 may be considered as extending rearwardly from the pivot or shaft 34.

The connecting rod of the four-bar linkage system 25 comprises an elongated link 36 having at opposite ends apertures 37 and 38. In assembly of the four-bar linkage system, the aperture 37 of the link 36 is aligned with apertures 39 in the distal ends of the links or cranks 26. The link 36 is pivotally coupled to the crank 26 by a short shaft 41. Similarly, the aperture 38 of the link 36 is aligned with apertures 42 in the rear ends 43 of the follower links 31. A short shaft 44 couples the link 36 to the follower links 31.

It will be recognized that the fixed link of the four-bar linkage system 25 comprises the reinforcing plate 21 and the end portion 24 of the reinforcing member 22 or at least that portion of the two receiving the fixed pivots or shafts 27-34 about which the cranks 26 and follower links 31 respectively pivot to oscillate the connecting link 36.

The connecting link 36 has an integral upwardly and rearwardly extending extension 45 having at its upper extremity a flat abutment surface 46. The flat abutment surface 46 is adapted to slidably engage a skid plate 47 secured to a flange 48 at the lower end of the back panel 49 of the backrest 12.

Figure 3:
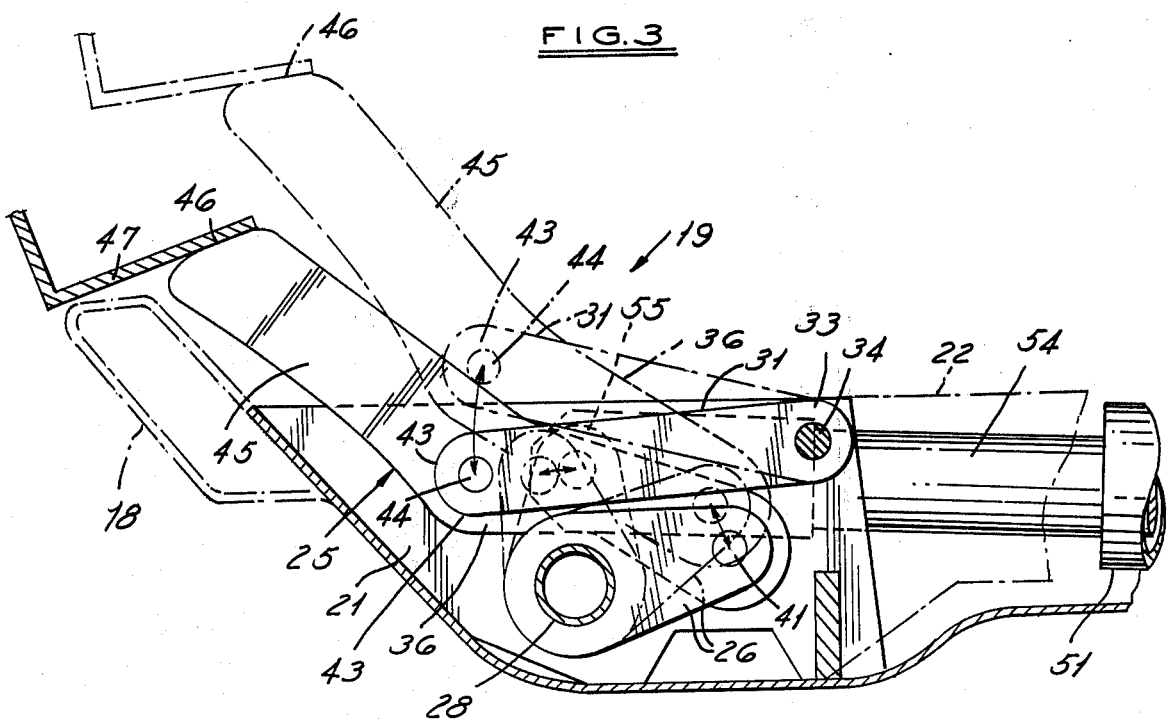
FIG. 3 is an enlarged fragmentary view in part sectional on the line 3—3 of FIG. 1 illustrating the linkage of the adjuster mechanism in two positions of operation.

As shown in FIG. 3, the abutment 46 maintains substantially the same relationship to the skid plate 47 in normal upright position of the backrest 12 as it does in reclined position of the backrest, this relationship being maintained during movement from the upright position to the reclined position and vice versa. That is, the abutment is movable under control of the four-bar linkage system 25 in a path substantially equivalent or complementary to that taken by the abutting portion or skid plate 47 of the backrest when the backrest is swung about the pivot axis defined by the pivot studs 15. The range of backrest swinging movement between its normal upright and its predetermined rearwardly declined positions is generally about 15°.

A releasable brake mechanism 51 is provided to hold the four-bar linkage system 25 and thereby the abutment 46 against movement. When the abutment is immobilized in the dash line position shown in FIG. 3, the backrest structure 12 cannot be forced rearwardly to the inclined position shown in solid outline. The brake mechanism 51 is anchored at 52 and extends alongside of a side rail 17. It has a clevis 53 opposite its anchored end 52 which is carried on the brake mechanism operating rod 54. The clevis 53 is coupled to a crank arm 55 fixed to the outer end of the shaft 27 coupling the two four-bar linkage units 19 to each other.

Reference may be made to either U.S. Pat. No. 3,046,055 or 3,062,584 cited above for a more detailed description of a brake mechanism for holding the backrest structure in a reclined position.

The operation of the seat assembly 10 may be summarized as follows:

To move the backrest 12 from a normal upright position to a rearwardly inclined recliner position, the brake mechanism must first be released by actuation of an operating handle or lever (not visible). The backrest may then be urged to swing rearwardly about its pivot axis. This may be done by the application of rearward pressure to the backrest causing the latter to be swung in a counterclockwise direction, as viewed in the drawings, about the pivot studs 15. This results in a downward movement of the skid plates 47 which in turn force the abutments 46 downward causing the elongated links 36 of each four-bar linkage mechanism 25 to rock on its driver 26 and follower 31 links. The rearward tilt of the backrest may be interrupted in any position between its upright position and the maximum recliner position which in the present embodiment is about 15° from the upright position.

Regardless of the angle of inclination, the backrest 12 may be pulled forwardly over the seat cushion frame 11 at any time without the necessity of actuating the brake mechanism 51 release handle or lever since there is no interlock between the link 36 carrying the abutment 46 and the skid plate 47. Thus, the backrest may be tilted forwardly independently of the four-bar linkage system 25 to provide an enlarged access passageway for ingress or egress relative to the seating area of the vehicle body behind the seat.

If it is desired to move the backrest 12 from a reclined position toward or to the upright position, it is necessary to actuate the release handle on the brake mechanism 51 so that the latter can drive the four-bar linkage systems 25 in a direction to maintain the abutting relationship between the abutments 46 and the skid plates 47. As viewed in FIG. 3, this is in a clockwise direction from the solid outline position of the elongated link 36 to the dashed line position. As will be understood with reference to the patents disclosing the brake mechanisms that might be used in the present seat assembly, such mechanisms usually include a restoring spring for assisting in the restoration of the seat backrest structure to an upright position after it has been placed in a reclined position.

It is to be understood this invention is not limited to the exact construction illustrated and described above, but that various changes and modifications may be made without departing from the spirit and scope of the invention as defined by the following claims.

I claim:

1. A vehicle seat assembly comprising:
   a substantially horizontal seat structure and a normally upright backrest structure,
   the backrest structure being carried on support arms pivotally connected to the seat structure for swinging movement about a single fixed pivot axis extending laterally of the latter,
a four-bar linkage adjuster mechanism interposed between the seat structure and the backrest structure,
the four-bar linkage of the adjuster mechanism terminating in a movable abutment engageable by an abutting portion of the backrest structure,
the four-bar linkage adjuster mechanism comprising a first crank coupled to a drive shaft journalled on the seat structure for rotation about a fixed pivot axis paralleling the backrest structure,
the drive shaft being coupled by a second crank to the brake means,
a follower link having one end pivotally coupled to the seat structure for movement about a pivot axis paralleling the drive shaft pivot axis,
and a connecting rod extending from the first crank to the other end of the follower link,
the abutment being located on the distal end of an extension of the connecting rod,
the abutment being movable under control of the linkage in a path substantially complementary to that taken by the abutting portion of the backrest when the latter is swung rearwardly from its normal upright position to a predetermined rearwardly reclined position,
and releasable brake means holding the four-bar linkage and thereby the abutment against movement to block rearward inclination of the backrest structure,
the backrest being forwardly swingable relative to the seat structure from any position independently of engagement with the adjuster mechanism.

2. A vehicle seat assembly according to claim 1, in which:
the adjuster mechanism comprises duplicate four-bar linkage units coupled to the drive shaft at each side of the horizontal seat structure.

* * * * *